Sept. 19, 1961 P. R. THOMASCO 3,000,409
MEASURING DEVICE FOR GRANULAR AND LIKE MATERIALS
Filed Sept. 12, 1958 2 Sheets-Sheet 1
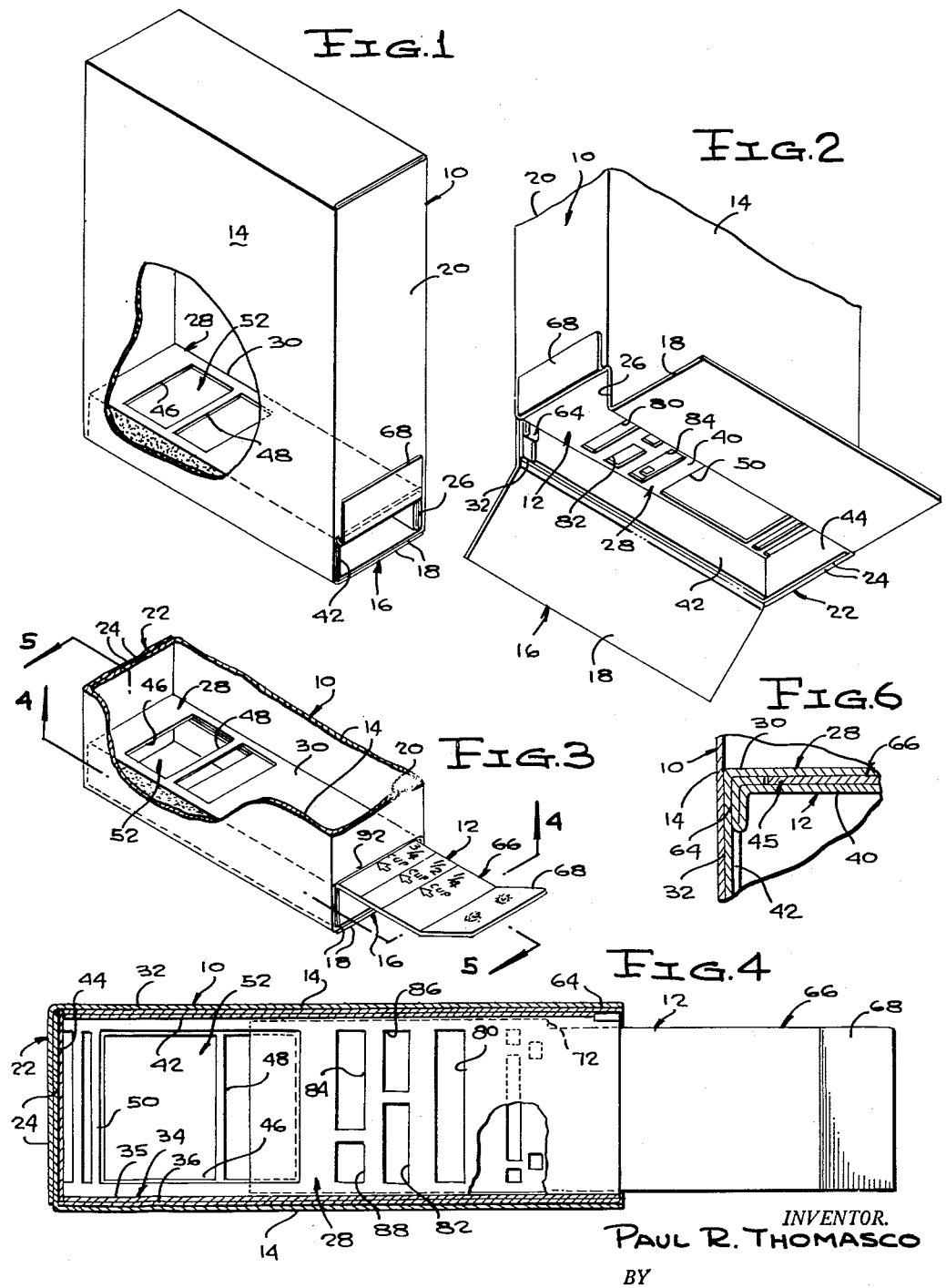
INVENTOR.
PAUL R. THOMASCO
BY
McMorrow, Berman + Davidson
ATTORNEYS Sept. 19, 1961  P. R. THOMASCO  3,000,409
MEASURING DEVICE FOR GRANULAR AND LIKE MATERIALS
Filed Sept. 12, 1958                                  2 Sheets-Sheet 2
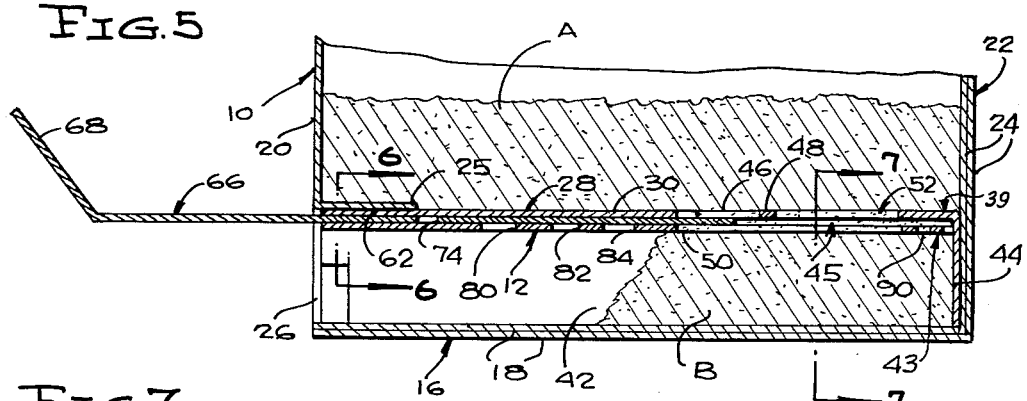
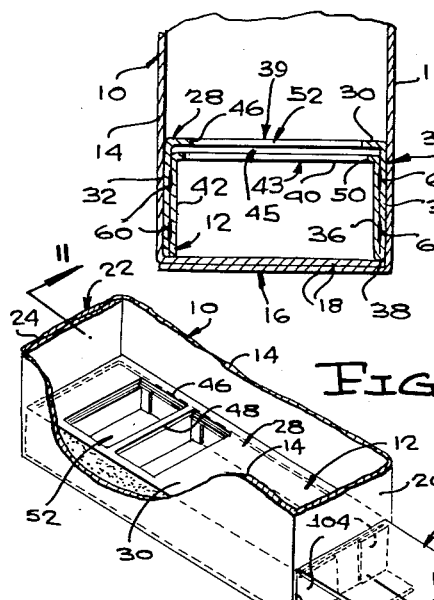
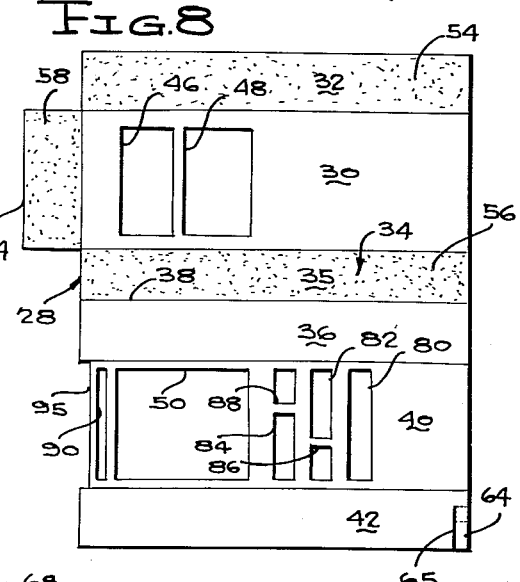
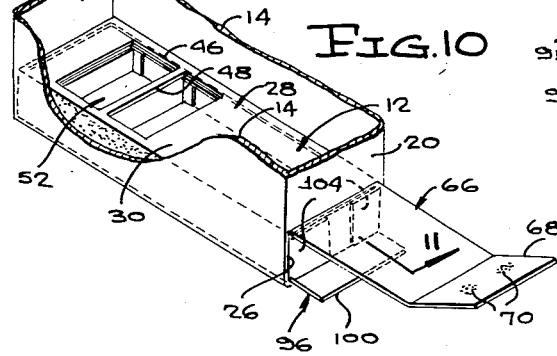
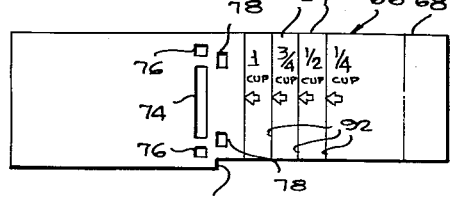
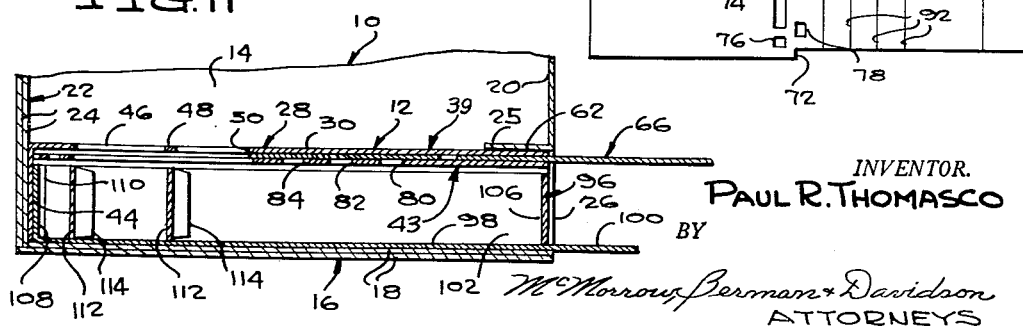
INVENTOR.
PAUL R. THOMASCO
BY
McMorrow, Berman & Davidson
ATTORNEYS

United States Patent Office 3,000,409
Patented Sept. 19, 1961

3,000,409
MEASURING DEVICE FOR GRANULAR AND
LIKE MATERIALS
Paul R. Thomasco, 205 S. 3rd St., Lebanon, Pa.
Filed Sept. 12, 1958, Ser. No. 760,756
4 Claims. (Cl. 141—373)

This invention relates generally to measuring devices adapted for incorporation in the dispensing portions of containers. More particularly, the invention has reference to a device adapted especially for association with containers holding granular, powdered, or other finely comminuted solids.

Summarized briefly, the measuring device comprising the present invention is adapted for mounting in the lower end portion of a container, such as a disposable cardboard box holding any of various granular materials, that are to be dispensed by gravitational action through the lower end of the container, with the amount of material dispensed being measured at the time it is dispensed, thus to remove from the container only a selected, predetermined quantity of said material. The invention comprises a folded blank mounted in the lower end of the container, said blank being so designed as to provide a dispensing opening at said lower end of the cardboard carton or equivalent container. The housing is so designed as to provide a slideway when in its folded, operative condition. In accordance with the present invention, a dispensing slide is mounted in said slideway, and is normally retracted so as to prevent accidental gravitation of the container contents through the mentioned dispensing opening. However, whenever a predetermined quantity of material is to be dispensed, said slide is readily operable to a selected, extended position, and is provided with indicia selectively registrable with the front wall of the container so as to cause only a corresponding, predetermined amount of material to be permitted gravitational movement through the dispensing opening. The arrangement is such that the container bottom is spaced downwardly from the dispensing opening, whereby the dispensed material will mound within the opening after the selected, predetermined quantity (or an amount of material closely approximating said predetermined quantity) has gravitated through the dispensing opening. The position of the slide, of course, determines the extent of the dispensing opening that will be uncovered and there is, thus, a corresponding regulation of the size of the mound of material accumulating below said opening on the container bottom.

As a feature adapted for association with the housing and slide described above, there is provided a receiving drawer for the material, which is slidable within the housing, and which can be removed after receiving a predetermined amount of the dispensed material. Said drawer is usable at the option of the manufacturer, and is designed to provide for more accurate measurements, should the nature of the material or the requirements of the particular situation make it advisable that the measured or metered quantity of dispensed material be more accurately determined during the normal usage of the invention.

Among important objects of the present invention are the following:

To provide a dispensing device of the character stated which can be manufactured as a very low cost, from inexpensive materials capable of being readily cut and folded to shape;

Second, to so form the device as to permit it to be easily mountable in the lower end of a generally conventional disposable carton, during the manufacture and packaging of the boxed product;

Third, to provide a measuring device which will be usable with maximum ease, and without danger of clogging of the material in the various interstices resulting from the folding of the component parts of the device one upon another;

Fourth, to provide a measuring device that will meter out the dispensed material with sufficient accuracy for ordinary household purposes; and Fifth, to provide a measuring device of the character stated which will be of a generally improved construction as compared to previous devices intended for measuring granular materials during the dispensing thereof.

Other objects will appear from the following description, the claims appended thereto, and from the annexed drawings, in which like reference characters designate like parts throughout the several views, and wherein:

FIGURE 1 is a perspective view of a container having associated therewith a measuring device according to the present invention, a portion of the container side wall being broken away, the slide being in a fully retracted position;

FIGURE 2 is a fragmentary perspective view looking upwardly at the bottom of the container with the slide in a fully retracted position, the bottom wall of the container being opened so as to show the details of construction of the measuring device;

FIGURE 3 is a fragmentary perspective view of the container showing the lower end portion thereof with the slide partially extended;

FIGURE 4 is a sectional view on an enlarged scale, taken through the device substantially on line 4—4 of FIGURE 3;

FIGURE 5 is a sectional view, on the same scale as FIGURE 4, taken substantially on line 5—5 of FIGURE 3;

FIGURE 6 is a still further enlarged, detail sectional view substantially on line 6—6 of FIGURE 5, showing the stop means for limiting the movement of the slide beyond an extreme extended position thereof;

FIGURE 7 is a transverse sectional view on the same scale as FIGURE 5, taken substantially on line 7—7 of FIGURE 5;

FIGURE 8 is a plan view, on a scale reduced below that of FIGURES 4–7, illustrating the blank from which the housing of the measuring device is formed;

FIGURE 9 is a plan view, on the same scale as FIGURE 8, showing the blank from which the dispensing slide is formed;

FIGURE 10 is a view like FIGURE 3 showing the device equipped with a drawer, said drawer being fully retracted; and, FIGURE 11 is a sectional view, on a scale enlarged above that of FIGURE 10, taken on line 11—11 of FIGURE 10.

Referring to the drawings in detail, generally designated at 10 is a carton adapted to hold granular materials or the like. The carton, container or box 10, in a typical arrangement, would be made of a disposable, inexpensive material such as cardboard or the like. Generally designated at 12 is the measuring device, which as shown in FIGURES 1 and 2 is mounted in the lower end of the container or carton 10.

The container is provided with side walls 14, a front wall 20, a back wall 22 comprised of overlapped, adhesively connected back container wall flaps 24, and a front flap 25 formed out of the material of the front wall 20 at the lower end of the container, said front flap 25 being foldable inwardly and defining, immediately below the same, a front dispensing opening 26. The materials dispensed from the container flow out of the dispensing opening 26, in a manner to be described in full detail hereinafter.

Considering now the construction of the measuring device 12, and referring particularly to FIGURE 8, said measuring device includes as one component thereof a housing generally designated 28. Housing 28 is formed from a single piece of inexpensive, readily foldable, semi-rigid material such as thin cardboard.

The housing 28, as shown in FIGURE 8, includes a top panel 30, the area of which is such as to cause the same to extend over the full area of the lower end of the container. The top panel 30, along one side thereof, is integral with an outer side panel 32. The housing includes, along the other side of the top panel 30, an inner side panel generally designated 34. Inner side panel 34 comprises first and second inner side panel sections 35, 36, respectively, foldable into superposed relation along a fold line 38. Top panel 30 constitutes the web of a channel member 39 of inverted U-shape in cross-section. Side panel 32 and panel section 35 constitute the side walls of said channel member. The second inner side panel section 36 is integral with a bottom panel 40 which is in turn integral with a longitudinal or side flange 42. Panel 40 is the web of a channel member 43 nested in the channel member 39. Panel section 36 and flange 42 are the side walls of the channel member 43.

Integrally formed upon one end of the top panel 30 is a back flap 44 of the housing.

The manner in which the housing is folded is of particular importance. FIGURE 7 shows the folding arrangement to particular advantage, and as will be noted, the outer side panel 32 is folded downwardly along the line of its integral connection to the top panel 30.

Panel section 35 is also folded downwardly relative to the top panel 30, after which the panel section 36 is foldable upwardly against the inner face of the section 35, into face-to-face contact with said section 35 (see FIGURE 7). The bottom panel 40 then is extended in underlying, closely spaced relation to the top panel 30, defining therebetween a shallow slideway 45 that extends across the full width of the container, and that extends, further, the full distance between the front and back walls 20, 22 of said container. Flange 42 is folded downwardly into face-to-face relation with the outer side panel 32, so that the housing is thus provided with side panels that are each of double thickness. This materially strengthens the housing. Further, the housing, as will be noted from FIGURE 7, may be considered as being of inverted U-shape in cross-section, with the bottom edges of the side panels resting upon the bottom wall 16 of the carton, said bottom wall of the carton being defined by the overlapped bottom wall flaps 18.

Adjacent one end of the top panel 30, there is formed therein a large, rectangular dispensing aperture 46. In order to provide for sufficient rigidity of the top panel despite the existence of the dispensing aperture 46, there is utilized a crossbar 48 extending across the aperture.

Bottom panel 40 has a dispensing aperture 50 in registration with the aperture 46, and the apertures 46, 50 cooperate to define a dispensing opening 52 in the housing. The materials disposed within the container are adapted to gravitate through said dispensing opening 52, mounding upon the bottom wall 16, under certain conditions to be described in detail hereinafter.

It will be understood that suitable adhesive connections, or their equivalents, are employed as necessary, to impart the desired cross-sectional shape to the folded housing blank. Thus, as shown in FIGURE 8, adhesive 54, 56, 58 is applied to the outer side panel 32, the first inner side panel section 35, and the back flap 44, so that these components will be fixedly connectible to the adjacent surfaces of the side and back walls, respectively, of the housing.

Further, as shown in FIGURE 7, spots of adhesive 60 may be employed to connect together the flange 42 and outer side panel 32 at one side of the housing, and the panel sections 35, 36 at the other side of the housing. Also, when the device is mounted in the container, flap 25 of the container is connected by adhesive 62 to the top surface of the top panel 30 (see FIGURE 5).

The slideway referred to previously herein is provided with a stop or abutment, adjacent the opening 26, designed to limit extension of the slide. Said stop has been designated at 64, and is integrally formed with the flange 42 (see FIGURES 2, 6 and 8). At one end of the flange 42, there is provided a slit 65 extending transversely of the flange, to define the ear or stop 64. Then, said stop is folded upon itself as shown to particular advantage in FIGURE 6, so that a portion of the stop projects laterally inwardly within the guideway 45.

A slide generally designated at 66 comprises a second important component of the device. This is formed from a single piece of material as shown in FIGURE 9, and at one end, said slide is provided with a pull tab 68 which projects exteriorly of the container as shown in FIGURE 1. Slide 66 is normally fully retracted as in FIGURES 1 and 2, and as shown in FIGURES 3 and 10, the tab 68 has spots of adhesive 70 which cause said tab to be initially connected firmly to the front wall 20 of the container, while the carton is awaiting sale. When the carton has been purchased, and the materials designated A are to be dispensed, one merely exerts a light pull upon the tab 68, to disconnect the same from the front wall 20.

The slide is now free to be pulled out, as for example to its partially extended position shown in FIGURES 3 and 4.

Referring to FIGURE 9, one side portion of the slide 66 is partially cut away, providing an abutment 72. Said abutment 72 is so located that on movement of the slide to an extended position, the slide will eventually be limited in said movement by engagement of the abutment 72 against the stop 64. In FIGURE 4, for example, the abutment is shown approaching the stop 64, though not yet in full engagement therewith. Thus, it will be apparent that in FIGURE 4 the slide has not been moved fully to its extreme extended position.

Formed in the slide, intermediate opposite ends thereof, is a transverse slot constituting an anti-clogging opening 74, adjacent opposite ends of which are formed small openings 76. In staggered relation to the openings 74, 76 are openings 78 spaced closely from the openings 74 longitudinally of the slide. These openings, it has been found, are so designed as to prevent clogging of the material during the normal use of the device. The manner in which said openings prevent clogging will be described in full detail hereinafter.

Referring to FIGURE 8, anti-clogging openings are also formed in the bottom panel 40. As will be noted, spaced longitudinally of the bottom panel, at one end of the dispensing aperture 50, are transversely disposed, slot-like openings 80, 82 and 84. Opens 82, 84 respectively have cross members 86, 88, these being relatively offset transversely of the bottom panel 40.

Adjacent the other end of the dispensing aperture 50, there is provided a transverse, anti-clogging opening 90.

As previously noted, the slide is normally disposed in a fully retracted position. When in such position, it extends completely over the dispensing opening 52 of the housing, so as to prevent the accidental gravitation of materials A through said opening. When, however, the slide is moved to a selected, extended position, it exposes the opening 52 to a selected extent, as for example to the extent shown in FIGURE 5. This permits the materials A to gravitate through the exposed portion of the dispensing opening 52. The materials A fall to the bottom wall 16, forming a mound as shown at B. Eventually, the space between the bottom panel 40 and the bottom wall 16 is completely bridged by the mounted material, so that further gravitation or dispensing of the materials A from the container into the space between the bottom panel 40 and bottom wall 16 stops. The mounded material, of course, comprises a predetermined quantity of material, so that on movement of the slide 66 to its normal, retracted position, the material designated at B in FIGURE 5 can be caused to flow outwardly through the front opening 26 by tilting of the container.

To facilitate the measurement of a selected quantity of material, the slide 66 is formed with transverse lines 92, which can be printed upon the slide or otherwise shown thereon. Said lines are selectively registrable with the front wall 20 on movement of the slide to a selected, extended position. Associated with the respective line markings 92 are numerical indicia 94, which can be of various types, and can be selected to measure any of various quantities. Those shown are merely representative of one type of measurement, and of course, the actual measurement, or the nature of the indicia identifying particular measurements, can be varied as desired by the manufacturer.

It will be seen that if, for example, the slide is extended to the line marking 92 intended for use in measuring out three-fourths of a cup of material, the dispensing opening 52 will be partially exposed as shown in FIGURE 3. The opening 52 will be exposed to an extent such as to cause the mounded material to approximate, sufficiently closely for ordinary household purposes, three-fourths of a cup of material.

It may be noted that in addition to the clean-out or anti-clogging openings provided in the bottom panel 40, one end of the bottom panel is cut away as shown at 95 in FIGURE 8. This provides additional anti-clogging space.

It has been found that openings 80, 82, 84 and 90 and the recess 95, serve efficiently as anti-clogging means when the slide is extended to a selected, dispensing position. When the slide is so extended, for the purpose of permitting the container contents to gravitate through the dispensing opening 52, a small amount of fine, granular material is drawn along upon the top surface of the slide. As the slide is moved toward its closed position following dispensing of the selected quantity, this fine material gravitates through anti-clogging openings 74, 76 and 78 when they align or register with the openings 80, 82 and 84.

As the slide moves fully to its completely retracted position, it pushes fine material ahead of it, along its leading edge. As this material passes over the opening and recess 90, 95 respectively, it gravitates therethrough, thus assuring a tight closing action.

The arrangement hereinbefore illustrated and described has been found to operate with full efficiency, when the measurements need not be completely accurate. In other words, for most household purposes the arrangement which has been described has been found to be usable for measuring quantities of material with sufficient closeness to meet the intended purposes to which said material is to be put. If, however, it is desired to provide for more accurate measurements, the manufacturer, or for that matter, the householder, can associate with the components illustrated in FIGURES 8 and 9 a third component. This would comprise a receiving drawer generally designated at 96 (FIGURES 10 and 11).

The receiving drawer is slidable within the housing, in the space between the bottom panel 40 and the bottom wall 16 of the container. Drawer 96, like the other components of the invention, can be formed from a single piece of inexpensive, fibrous material. It is provided, in the illustrated example, with a bottom wall 98 slidably contacting the bottom wall 16 of the container. Bottom wall 98 is integrally formed at its forward end with a pull flap 100 projecting exteriorly of the container. Integral with the bottom wall 98 at opposite sides thereof are upstanding sidewalls 102 slidably engaging against the respective side panels of the housing. Side walls 102 at their front ends have inwardly turned ears 104 adhesively secured to a front wall 106. A back wall 108 is adhesively secured to inwardly projecting ears 110 integrally formed upon the rear extremities of the side walls 102.

Extending transversely of the drawer, at selected locations spaced longitudinally thereof, are partitions 112, each of which is provided with flanges 114 that are adhesively secured to the inner surfaces of the side walls 102 of the drawer.

It will be seen that there is thus provided a compartmented drawer, having a handle or tab 100 by means of which the drawer can be moved outwardly from its normal retracted position shown in FIGURES 10 and 11. In use, when the slide 66 is extended outwardly to a selected degree, the material gravitating through the dispensing opening will fall into one of the compartments of the drawer, and will accumulate therein in the selected, predetermined quantity. This provides for a more accurate measurement than that which results when the material is merely permitted to mound as shown at B in FIGURE 5, upon the bottom wall 16.

Thus, in use of the device, one will pull out the slide 66 to the selected degree, to dispense the desired amount of material. This is done whether or not a drawer 96 is being used. Then, the slide is moved to its retracted position to close the dispensing opening.

If no drawer is being used, the dispensed material is merely caused to flow out through the opening 26 by tilting of the box. If, however, the drawer is being used, the dispensed material is removed by extracting the drawer, in which the material will have been deposited.

It will be seen that the device is inexpensively formed, and in one arrangement comprises merely two blanks, properly folded and associated in the manner previously described. Alternatively, the device comprises three pieces of fibrous material (see FIGURES 10 and 11). In every arrangement, of course, the device is usable to advantage with a generally conventional carton, and can be disposed of together with the carton, after the carton has been fully depleted of its contents.

It is believed apparent that the invention is not necessarily confined to the specific use or uses thereof described above, since it may be utilized for any purpose to which it may be suited. Nor is the invention to be necessarily limited to the specfiic construction illustrated and described, since such construction is only intended to be illustrative of the principles, it being considered that the invention comprehends any minor change in construction that may be permitted within the scope of the appended claims.

What is claimed is:

1. A measuring dispensing container comprising a bottom wall, side walls, and front and back walls, said front wall having a dispensing opening extending to said bottom wall and between the side walls, a horizontal housing within the container and bearing upon said bottom wall, said housing extending between the back and front walls and having an open front end registered with said dispensing opening, said housing having side walls secured to the container side walls and having bottom edges bearing upon the container bottom wall, and a top wall assembly, said top wall assembly comprising parallel spaced upper and lower top wall panels defining a slideway therebetween which includes portions of the housing side walls, said upper and lower top wall panels having registered openings therein, a slide panel slidably engaged in said slideway and having back and front ends, said slide panel having longitudinally spaced transverse openings therein which are selectively registrable with said upper and lower top wall panel openings, and a flap on the front end of the slide panel extending forwardly through said dispensing opening for operating the slide.

2. A measuring dispensing container comprising a bottom wall, side walls, and front and back walls, said front wall having a dispensing opening extending to said bottom wall and between the side walls, a horizontal housing within the container and bearing upon said bottom wall, said housing extending between the back and front walls and having an open front end registered with said dispensing opening, said housing having side walls secured to the container side walls and having bottom edges bearing upon the container bottom wall, and a top wall assembly, said top wall assembly comprising parallel spaced upper and lower top wall panels defining a slideway therebetween which includes portions of the housing side walls, said upper and lower top wall panels having registered openings therein, a slide panel slidably engaged in said slideway and having back and front ends, said slide panel having longitudinally spaced transverse openings therein which are selectively registrable with said upper and lower top wall panel openings, and a flap on the front end of the slide panel extending forwardly through said dispensing opening for operating the slide, a fold line connecting said flap to the front end of the slide panel, said flap being initially folded upwardly and releasably secured to the outer side of the container front wall above the dispensing opening.

3. A measuring dispensing container comprising a bottom wall, side walls, and front and back walls, said front wall having a dispensing opening extending to said bottom wall and between the side walls, a horizontal housing within the container and bearing upon said bottom wall, said housing extending between the back and front walls and having an open front end registered with said dispensing opening, said housing having side walls secured to the container side walls and having bottom edges bearing upon the container bottom wall, and a top wall assembly, said top wall assembly comprising parallel spaced upper and lower top wall panels defining a slideway therebetween which includes portions of the housing side walls, said upper and lower top wall panels having registered openings therein, a slide panel slidably engaged in said slideway and having back and front ends, said slide panel having longitudinally spaced transverse openings therein which are selectively registrable with said upper and lower top wall panel openings, and a flap on the front end of the slide panel extending forwardly through said dispensing opening for operating the slide, and a drawer slidably engaged in the housing beneath said top wall assembly and bearing upon the housing bottom wall, said drawer having back and front end walls, and a drawer operating flap on said front end wall and extending out through said dispensing opening.

4. A measuring dispensing container comprising a bottom wall, side walls, and front and back walls, said front wall having a dispensing opening extending to said bottom wall and between the side walls, a horizontal housing within the container and bearing upon said bottom wall, said housing extending between the back and front walls and having an open front end registered with said dispensing opening, said housing having side walls secured to the container side walls and having bottom edges bearing upon the container bottom wall, and a top wall assembly, said top wall assembly comprising parallel spaced upper and lower top wall panels defining a slideway therebetween which includes portions of the housing side walls, said upper and lower top wall panels having registered openings therein, a slide panel slidably engaged in said slideway and having back and front ends, said slide panel having longitudinally spaced transverse openings therein which are selectively registrable with said upper and lower top wall panel openings, and a flap on the front end of the slide panel extending forwardly through said dispensing opening for operating the slide, and a drawer slidably engaged in the housing beneath said top wall assembly and bearing upon the housing bottom wall, said drawer having back and front end walls, and a drawer operating flap on said front end wall and extending out through said dispensing opening, said drawer being substantially the length of the housing, said drawer front end wall serving as a closure for the dispensing opening in the retracted position of the drawer.

References Cited in the file of this patent
UNITED STATES PATENTS

| | | |
|---|---|---|
| 1,665,139 | Lundholm | Apr. 3, 1928 |
| 1,913,767 | Mills | June 13, 1933 |
| 2,162,999 | Frank | June 20, 1939 |